United States Patent [19]

McCabe et al.

[11] Patent Number: 5,089,547

[45] Date of Patent: Feb. 18, 1992

[54] CROSS-LINKED LOW SURFACE ADHESION ADDITIVES FOR TONER COMPOSITIONS

[75] Inventors: John M. McCabe, Pittsford; John C. Wilson, Rochester, both of N.Y.

[73] Assignee: Eastman Kodak Company, Rochester, N.Y.

[21] Appl. No.: 563,002

[22] Filed: Aug. 6, 1990

[51] Int. Cl.$^5$ .............................................. C08L 75/04
[52] U.S. Cl. .................................... 524/262; 524/267; 525/438; 525/476; 528/106; 528/119
[58] Field of Search ................ 524/262, 267; 525/438, 525/476; 528/106, 119; 430/110

[56] References Cited

U.S. PATENT DOCUMENTS

| | | | |
|---|---|---|---|
| 4,155,883 | 5/1979 | Oguchi et al. | 252/52.1 |
| 4,554,232 | 11/1985 | Tabaru et al. | 430/106.6 |
| 4,758,491 | 7/1988 | Alexandrovich et al. | 430/109 |
| 4,876,169 | 10/1989 | Gruber et al. | 430/110 |

FOREIGN PATENT DOCUMENTS 58014143 7/1981 Japan.
63055564 8/1986 Japan.

*Primary Examiner*—Maurice J. Welsh
*Attorney, Agent, or Firm*—Dressler, Goldsmith, Shore, Sutker & Milnamow, Ltd.

[57] ABSTRACT

A cross-linked low surface adhesion composition, that can be utilized as either an electrographic toner powder or as an additive for conventional electrographic toner powder, exhibits improved transfer and contributes to an increase in the useful life of the developer. The low surface adhesion composition employs a silicone resin and a polyester resin cross-linked with a polyfunctional epoxy novolac resin.

9 Claims, No Drawings

CROSS-LINKED LOW SURFACE ADHESION ADDITIVES FOR TONER COMPOSITIONS

FIELD OF THE INVENTION

This invention is in the field of low surface adhesion additives that comprise a silicone resin and polyester resin cross-linked with an epoxy novolac resin.

BACKGROUND OF THE INVENTION

In the art of electrophotography, there is a need for low-cost, hydrolytically stable, low surface adhesion (LSA) additives for electrographic toner powders. LSA additives provide improved transfer of toner from the photoconductor to the receiver and increase the developer life. LSA additives should be cost effective and stable in order to maintain good manufacturing control of the toner composition.

To achieve such results, various approaches have been tried. One approach has been to utilize block copolymer LSA additives produced by copolymerizing a primary amine-terminated silicone oil, which reduces surface adhesion, with a polyester. The synthesis of these LSA additives is expensive and requires the use of acid and base washes that result in degradative hydrolysis of the LSA additive. Hydrolysis results in a lowering of the molecular weight of the polyester block over time which can undesirably produce variability of the dispersion quality of the LSA additive in the toner powder.

Another approach has been to admix, without reacting, a silicone oil with a toner powder. However, these admixtures are unsatisfactory because the silicone oil is not immobilized which can cause premature failure of the developer.

So far as is now known, prior art approaches have not solved the problem of producing a low cost, hydrolytically stable LSA additive.

SUMMARY OF THE INVENTION

This invention relates to cross-inked low surface adhesion (LSA) additives for use in toner compositions comprising a silicone resin that has been coreacted with a polyester resin and a multifunctional epoxy novolac resin. The LSA additive can be directly formed in the toner during compounding or it can be added to a conventional toner formulation. The crosslinked LSA additives improve transfer from the photoconductor to the receiver and increase the useful life of the developer.

While desiring not to be bound by a theory, it is presently believed that cross-linking the silicone resin and the polyester resin with the epoxy novolac resin improves the compatability of the silicone resin and immobilizes it.

The LSA additives of the present invention are economical and hydrolytically stable. The silicone resin is immobilized because it is an integral part of the LSA additive and therefore the silicone cannot transfer onto the surface of the carrier particles and cause premature failure of the developer.

A process for making the LSA additives of the present invention is also disclosed.

Various other features, advantages, aims, purposes, embodiments and the like of this invention will be apparent to those skilled in the art from the present specification and appended claims.

DETAILED DESCRIPTION OF THE PREFERRED EMBODIMENTS

The present invention relates to cross-linked low surface adhesion (LSA) additives comprising a silicone resin that has been coreacted with a polyester resin and cross-linked with a multifunctional epoxy novolac resin.

The silicone resins useful in the compositions of the present invention have a functional group that is reactive with the epoxide group of the epoxy novolac resin. Representative functional groups are amino groups, acid groups, e.g., carboxylic acid groups, and the like. Preferred functional groups are primary and secondary amines.

The absolute number average molecular weight of the silicone resin is preferably in the range of about 500 to about 25,000, more preferably in the range of about 1,000 to about 15,000.

Representative of the silicone resins suitable for use herein are those having the Formula I:

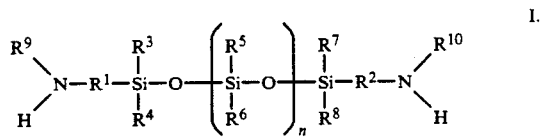

wherein $R^1$ and $R^2$ are lower alkylene; $R^3$, $R^4$, $R^5$, $R^6$, $R^7$, and $R^8$ are each independently selected from lower alkyl and aryl; $R^9$ and $R^{10}$ are each independently selected from hydrogen and lower alkyl; and n is an integer from about 10 to about 400.

As used herein the term "lower alkyl" shall mean straight and branched chain alkyl groups having up to four carbon atoms. Representative lower alkyl groups are isopropyl, tert-butyl, methyl, ethyl, n-propyl, n-butyl, and the like.

Preferably, $R_1$ and $R_2$ are alike and are 1,3-propylene or 2-methyl-1,3-propylene groups; $R^3$, $R^4$, $R^5$, $R^6$, $R^7$, and $R^8$ are either methyl or phenyl groups; and n is from about 10 to about 400.

A commercially available primary amineterminated silicone resin of Formula I wherein $R^1$ and $R^2$ are 1,3-propylene groups, $R^3$ to $R^8$ are methyl groups and $R^9$ and $R^{10}$ are hydrogen is PS-513 from Petrarch Chemicals.

A commercially available secondary amineterminated silicone resin of Formula I wherein $R^1$ and $R^2$ are 2-methyl-1,3-propylene groups and $R^3$ to $R^{10}$ are methyl groups is X2-2665 from Dow Corning.

The polyester has an acid content of about 0.1 to about 0.7 meq/g, preferably from about 0.18 to about 0.3 meq/g, of acid functionality. The number average molecular weight is in the range of about 1,000 to about 4,000, preferably from about 1,500 to about 3,000. The weight average molecular weight is in the range of about 2,000 to about 15,000, preferably from about 3,000 to about 10,000. The polyester has a glass transition temperature ($T_g$) in the range of about 50° to about 85° C., preferably from about 60° to about 75° C.

As those skilled in the art will appreciate, the polyester can have many structures depending upon such variables as the monomers used for polycondensation and the condensation conditions employed. For example, the presence of a suitable molar excess of polyhydroxylated compound can be used to regulate the molecular weight of the polyester. All, or a chosen portion, of the hydroxyl groups can then be reacted (carboxylated) with a polycarboxylic acid anhydride to achieve a quantity of reactable carboxyl groups per molecule. Suitable acid anhydrides are preferably aromatic and preferably contain at least two carboxyl groups per molecule when in the hydrated (or acid) form. Examples of suitable anhydrides include pyromellitic dianhydride, trimellitic anhydride, phthalic anhydride, 3,3',4,4'-benzophenonetetracarboxylic dianhydride, glutaric anhydride, succinic anhydride, maleic anhydride, and the like. The carboxylation reaction of a polyester with such an acid anhydride is conveniently carried out at elevated temperature under liquid phase conditions.

Tri or tetra functional carboxylic acids can also be employed for condensation with diols using conditions which result in polyesters that contain a desired quantity of reactable carboxyl groups per molecule.

One presently preferred class of polyesters comprises:
about 50 to about 99 mole percent terephthalic acid;
about 0 to 49 mole percent additional diacid(s);
about 1 to about 15 mole percent trimellitic anhydride;
about 50 to about 100 mole percent neopentyl glycol; and
0 to about 50 mole percent 1,4cyclohexanedimethanol.

It should be noted that mole percents for the polyacid components are based upon total polyacid components and glycol mole percents are based upon total glycol components.

The polyester has a $T_9$ in the range of about 50° to 85° C. and has an acid content of about 0.1 to about 0.7 meq/g of acid functionality.

The term "glass transition temperature," as used in its various grammatical forms, identifies the temperature at which a polymer changes from a glassy state to a rubbery state. The glass transition temperature can be measured by differential thermal analysis as disclosed in "Techniques and Methods of Polymer Evaluation," Vol. 1, Marcel Dekker, Inc., NY 1966.

The term "keep" or "keeping" as used herein in relation to a toner powder means the storage stability of the toner powder (i.e., its ability to retain its original particle size distribution when stored in a cartridge at a specified range of temperature and RH conditions. An accelerated keep test measures the ability of the toner to retain its fine powder flow characteristics. A small amount of toner is added to a cylindrical glass vial. A cylindrical weight is placed over the packed toner layer (to simulate the toner at the bottom of a cartridge) and the vial is placed in an oven for a set period of time at a set temperature. Toner keep is controlled by the glass transition temperature or softening point of the toner. The keep is subjectively evaluated by removing the toner from the vial after the incubation period and determining its powder characteristics by applying some pressure to the packed powder. If it retains its original powder form without applying any pressure or with slight pressure it rates good to excellent. A fair keep indicates that some pressure is required to break up the clump. Poor and fused keep ratings indicate partial or total sintering of the packed powder.

Representative commercially available polyester resins are Cargill 3000 polyester resin and Cargill 3018 polyester resin, both from Cargill, Carpentersville, IL.

The low molecular weight epoxy novolac resin has about 2 to about 6 epoxide groups per molecule.

The term "epoxy novolac resin" as used herein means an epoxy resin made by the reaction of epichlorohydrin with a novolac resin. An epoxy novolac resin has the pendant repeating epoxide structure:

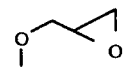

A novolac resin is a condensate of a phenol compound with formaldehyde that is prepared in the presence of acid catalysts. The phenol compound can be phenol itself, or such compounds as the cresols, xylenols, resorcinol, naphthols, and the like. Epoxy novolac resins used in the practice of this invention have epoxy functionalities which are typically in the range of about 2.5 to about 6.

One presently preferred class of epoxy novolac resins comprises epoxy cresol novolac resins having a molecular weight in the range of about 500 to about 1,300. These resins are prepared by the condensation of cresol and formaldehyde followed by reaction with epichlorohydrin to produce a polymer having an epoxy functionality in the range of about 2.5 to about 6.

An example of a presently particularly preferred epoxy cresol novolac resin is characterized by the structure:

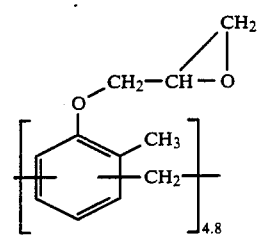

This epoxy resin is obtainable from Ciba-Geigy Corp. under the trade designation "ECN 1273" and has an epoxy functionality of about 4.8.

The silicone resin in the LSA additive is preferably present in an amount in the range of about 1 to about 35, more preferably about 3 to about 30, wt% based upon the total weight of the LSA additive.

The polyester resin is preferably present in an amount in the range of about 65 to about 98, more preferably about 70 to about 95, wt% based upon the total weight of the LSA additive.

The epoxy novolac resin is preferably present in an amount in the range of about 1 to about 5, more preferably about 1.5 to about 4, wt. based upon the total weight of the LSA additive.

Preferably, a conventional catalyst is utilized in the LSA additive. Representative catalysts include imidazolines, e.g., 2-phenyl-2-imidazoline. A suitable 2-phenyl-2-imidazoline catalyst is commercially available from huls Chemische Werke under the trade designation Hardener B-31.

The catalyst is preferably present in an amount in the range of about 0.5 to about 1.5 wt% based on the total weight of the LSA additive.

The components of the LSA additive of the present invention can be blended prior to introduction into a melt reactor by admixing at conditions that do not cause the cross-linking reaction to proceed. The cross-linking reaction can be performed in the melt reactor.

Suitable melt reactors include single and twin screw extruders, roll mills, mixers and the like that subject the components of the toner composition to elevated pressure and temperatures.

Representative melt reactors include Brabender Plasticorder mixers, Werner-Pfleiderer twin screw extruders and the like.

The time period required to complete the cross-linking reaction and produce the LSA additive is dependent upon the pressure and temperature at which the cross-linking reaction is performed.

The LSA additive can be ground using a conventional apparatus such as a Trost TX air pulverizer.

The cross-linked LSA additives can be utilized in electrographic toner compositions with conventional charge control agents and carbon black also being present in the compositions.

Suitable charge control agents for use in toner powders of the present invention are disclosed, for example, in U.S. Pat. Nos. 3,893,935; 4,079,014; and 4,323,634; and British Patent Nos. 1,501,065 and 1,420,839. Charge control agents are generally employed in small quantities, such as about 0.1 to about 3 weight percent on a total toner powder weight basis, and preferably, about 0.2 to about 5 weight percent.

Suitable dyes and pigments for use in toner powders of the present invention are disclosed, for example, in U.S. Reissue Patent No. 31,072. One particularly useful colorant for toners to be used in black and white electrophotographic copying machines is carbon black. When employed, colorants are generally present in quantities in the range of about 1 to about 30 weight percent on a total toner powder weight basis, and preferably about 1 to about 8 weight percent.

A further optional material is a crystallization promoter for the crystallization of polyester resins. Examples include inorganic pigments, such as aluminum silicates, titanium dioxide, and the like: polyethylenes, such as those available commercially under the name Epolenes ™ from Eastman Kodak Company, and the like; ionomers, such as those available from E. I. DuPont de Nemours & Company; and the like.

The silicone resin is preferably present in a toner composition in an amount in the range of about 0.25 to about 2.0, more preferably about 0.5 to about 1.0, parts per hundred parts of conventional toner composition or powder.

The following Examples are provided by way of illustration, and not limitation, of the preferred embodiments present invention.

EXAMPLE 1

CROSS-LINKED LSA ADDITIVE IN A CROSS-LINKED POLYESTER TONER POWDER

A cross-linked LSA additive suitable for use as a toner powder having an integral silicone resin was prepared by melt blending 0.60 g of a primary amineterminated silicone resin (Petrarch PS-513, commercially available from Petrarch), 60.0 g of a polyester resin (Cargill 3018, commercially available from Cargill), 1.86 g of an epoxy cresol novolac resin (ECN 1273, commercially available from Ciba-Geigy), 0.60 g of a catalyst (Hardener B-31, commercially available from hul Chemische Werke) and 3.67 g of carbon black (Regal 300 carbon black, commercially available from Cabot Company) on an 8"roll mill for a time period of 20 minutes at a temperature of 100° C. At the end of this time period, the melt blend was introduced into the bowl of a Brabender Plasticorder mixer and reacted at a temperature of 200° C. at 90 revolutions per minute (rpm) for a time period of 10 minutes.

After removal from the Brabender Plasticorder, the resulting toner containing a cross-linked LSA additive composition was ground in a Trost TX air pulverizer to produce a toner powder having an integral silicone resin.

Toner powders must provide appropriate transfer characteristics for a toner image deposit when a corona charger is utilized. One indication of appropriate transfer characteristics is the sink rate which is a measure of the toner powder's surface energy. Toner powders having a sink rate of about 0.5 milligrams per second (mg/sec) provide appropriate transfer characteristics. The sink rate is measured by placing 0.2 g of the toner powder to be analyzed on the surface of an aqueous solution of $5.0 \times 10^{-3}$ percent Triton X-100 surfactant, commercially available from Rohm and Haas Co. The time required for all of the toner powder to sink below the surface of the solution is measured. The sink rate is equal to the weight of the toner powder divided by the time required for all of the toner powder to sink below the surface. Toner powders having high sink rates may show poor transfer characteristics while toner powders having low rates may experience difficulties in flow because of cohesiveness.

The sink rate of the toner powder of this Example was 0.11 mg/sec and is satisfactory.

EXAMPLE 2

CROSS-LINKED LSA COMPOSITION

A cross-linked LSA additive suitable for use as either a toner powder containing an integral silicone resin or a cross-linked LSA additive for a conventional toner powder was prepared utilizing the process described in Example 1. The cross-linked LSA additive was prepared from 2.4 g of a silicone resin (Petrarch PS-513), 60.0 g of a polyester resin (Cargill 3018), 1.86 g of an epoxy cresol novolac resin (ECN 1273), 0.60 g of a catalyst (Hardener B-31) and 3.67 g carbon black (Regal 300). The lowest sink rate measured was 0.11 mg/sec. This cross-linked LSA additive is suitable for use as a toner composition containing an integral silicone resin and can be utilized as a cross-linked LSA additive for conventional electrographic toner powders.

EXAMPLE 3

LSA CROSS-LINKED BLOCK COPOLYMER FROM A CARBOXYLATED POLYESTER, AN AMINETERMINATED POLYSILOXANE AND A POLYEPOXIDE

A mixture of 50.0 g (22.05 meq) of poly (1,2-propylene terephthalate:glutarate 85:15) carboxylated with pyromellitic dianhydride (50% carboxylation of available hydroxyl functions) and 2.5 g (3.6 meq) of an aminopropyl terminated poly(dimethylsiloxane:diphenylsiloxane 50:50) derived from 1,3-bis(3-aminopropyl)-1,1,3,3-tetramethyldisiloxane, octamethylcyclotetrasiloxane and octaphenylcyclotetrasiloxane was heated to a melt under nitrogen at approximately 200° C. To the melt was added 5.76 g (25.65 meq) of ECN 1273 polyepoxide and the mixture was blended with stirring for 5 minutes. Methyltriphenylphosphonium tosylate (2.33 g) was added and the melt was stirred for another 2 minutes whereupon the resultant polymer wrapped around the stirrer. The homogeneous melt was cooled and by DSC exhibited Tgs of −71° C. and 65.5° C.

EXAMPLE 4

TONER POWDER ADMIXED WITH A CROSS-LINKED LSA ADDITIVE

A toner powder was prepared by admixing 5.0 g of the cross-linked LSA additive of Example 2, 25.0 g of a branched polyester derived from dimethyl terephthalate, dimethyl glutarate, 1,2-propanediol, and glycerol (87/13/92.5/5) mole ratio, 0.30 g of a charge control agent (N-octadecyl-N,N-dimethylbenzylammonium m-nitrobenzenesulfonate), and 1.5 g of carbon black (Regal 300) on an 8" roll mill for a time period of 20 minutes at a temperature of 130° C. followed by grinding on the air pulverizer. The sink rate for this toner powder was 1.6 mg/sec. The transfer characteristics of this toner powder are suitable for many applications.

EXAMPLE 5

TONER POWDER ADMIXED WITH A CROSS-LINKED LSA ADDITIVE

A toner powder was prepared utilizing the procedure of Example 4, 20.0 g of the branched polyester of Example 4, 10.0 g of the LSA additive of Example 2, 0.30 g of the charge agent of Example 4 and 1.50 g of the carbon black of Example 4.

The sink rate for this toner powder was 0.26 mg/sec which represents a very good concentration of cross-linked LSA additive.

EXAMPLE 6

PREPARATION OF A CROSS-LINKED LSA ADDITIVE UTILIZING A PRIMARY AMINE-TERMINATED SILICONE RESIN

A cross-linked LSA additive was prepared utilizing 12.0 g of a silicone resin (Petrarch PS-513), 108 g of a polyester resin (Cargill 3018), 3.35 g of an epoxy cresol novolac resin (ECN 1273), and 1.08 g of a catalyst (Hardener B-31). The LSA additive was produced by melt blending the ingredients on an 8" roll mill for a time period of 20 minutes at a temperature of 100° C. followed by processing the melt blend in the Brabender Plasticorder at a temperature of 200° C., a speed of 90 rpm and for a time period of 10 minutes.

EXAMPLE 7

TONER POWDER ADMIXED WITH A CROSS-LINKED LSA ADDITIVE

A conventional toner was compounded using the cross-linked LSA additive of Example 6 utilizing the procedure of Example 4. This admixture was produced utilizing 1.67 g of the cross-linked LSA additive of Example 6, 28.33 g of the branched polyester of Example 4, 0.30 g of the charge control agent of Example 4, and 1.50 g of carbon black (Regal 300). After grinding to produce a powder, the sink rate was 0.73 mg/sec which represents a good sink rate.

EXAMPLE 8

TONER POWDER ADMIXED WITH A CROSS-LINKED LSA ADDITIVE

A conventional toner was compounded using the cross-linked LSA additive of Example 6 utilizing the procedure of Example 4. This admixture was produced utilizing 3.33 g of the cross-linked LSA additive of Example 6, 26.67 g of the branched polyester of Example 4, 0.30 g of the charge control agent of Example 4, and 1.50 g of carbon black (Regal 300). After grinding to produce a powder, the sink rate was 0.20 mg/sec which represents a good sink rate. This represents a toner with a good concentration of the cross-linked LSA additive.

EXAMPLE 9

PREPARATION OF A CROSS-LINKED LSA ADDITIVE UTILIZING A SECONDARY AMINE-TERMINATED SILICONE RESIN

A cross-linked LSA additive was prepared utilizing the procedure of Example 6 and 12.0 g of a secondary amine-terminated silicone resin (X2-2665, commercially available from Dow Corning), 108 g of a polyester resin (Cargill 3018), 3.35 g of an epoxy cresol novolac resin (ECN 1273) and 1.08 g of a catalyst (Hardener B-31).

EXAMPLE 10

CONVENTIONAL TONER POWDER ADMIXED WITH A CROSS-LINKED LSA ADDITIVE

A conventional toner was compounded using the cross-linked LSA additive of Example 9. The toner powder was prepared by introducing 0.28 kilograms (kg) of the cross-linked LSA additive of Example 9, 7.00 kg of the branched polyester of Example 4, 0.07 kg of the charge control agent of Example 4, 0.14 g of rhodamine methyl ester triflate dye and 0.07 kg of Morton Violet 14 (a mixture of 1,5-di-p-toluidinoanthraquinone and 1,8-di-p-toluidinoanthraquinone) into a twin screw extruder at a feed rate of about 12 to 13 kg per hour, a screw speed of 500 rpm, and With various sections at a temperature of about 250° F. After grinding to produce a powder, the sink rate was 0.16 mg/sec which represents a good level of the cross-linked LSA additive.

EXAMPLE 11

PREPARATION OF A CROSS-LINKED LSA ADDITIVE UTILIZING A SECONDARY AMINE-TERMINATED SILICONE RESIN

A cross-inked LSA additive was prepared utilizing the procedure of Example 6 and 24.0 g of a silicone resin (X2-2665), 60 g of a polyester resin (Cargill 3018), 1.86 g of an epoxy cresol novolac resin (ECN 1273) and 0.60 g of a catalyst (Hardener B-31).

EXAMPLE 12

TONER POWDER ADMIXED WITH A CROSS-LINKED LSA ADDITIVE

A conventional toner was compounded using the cross-linked LSA additive of Example 11 utilizing the procedure of Example 4. This admixture was produced utilizing 0.83 g of the cross-linked LSA additive of Example 11, 30.0 g of the branched polyester of Example 4, 0.30 g of the charge control agent of Example 4, and 1.50 g of carbon black (Regal 300). After grinding to produce a powder the sink rate was 1.1 mg/sec which represents a good sink rate. This represents a good concentration of the cross-linked LSA additive.

EXAMPLE 13

TONER POWDER ADMIXED WITH A CROSS-LINKED LSA ADDITIVE

A conventional toner was compounded using the cross-linked LSA additive of Example 11 utilizing the procedure of Example 4. This admixture was produced utilizing 1.17 g of the cross-linked LSA additive of Example 11, 30.0 g of the branched polyester of Example 4, 0.30 g of the charge control agent of Example 4, and 1.50 g of carbon black (Regal 300). After grinding to produce a powder, the sink rate Was 0.13 mg/sec which represents a good sink rate. This represents a good concentration of the cross-linked LSA additive.

We claim:

1. A cross-linked low surface adhesion composition comprising a silicone resin and a polyester resin cross-linked with a multifunctional epoxy novolac resin.

2. The low surface adhesion compositions in accordance with claim 1 wherein the silicone resin is present in an amount in the range of about 1 to about 35 weight percent, the polyester resin is present in an amount in the range of about 65 to about 98 weight percent, and the epoxy novolac resin is present in an amount in the range of about 1 to about 5 weight percents, the weight percents being based on the total weight of the low surface adhesion composition.

3. The low surface adhesion compositions in accordance with claim 1 wherein the silicone resin is present in an amount in the range of about 3 to about 30 weight percent, the polyester resin is present in an amount in the range of about 70 to about 95 weight percent, and the epoxy novolac resin is present in an amount in the range of about 1.5 to about 4 weight percent, the weight percents being based on the total weight of the low surface adhesion composition.

4. The low surface adhesion compositions in accordance with claim 1 wherein the silicone resin has the formula:

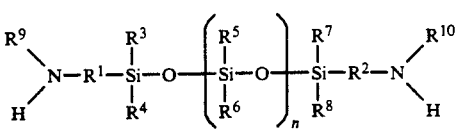

wherein $R^1$ and $R^2$ are lower alkylene; $R^3$, $R^4$, $R^5$, $R^6$, $R^7$, and $R^8$ are each independently selected from lower alkyl and aryl; $R^9$ and $R^{10}$ are each independently selected from hydrogen and lower alkyl; and n is an integer from about 10 to about 400.

5. The low surface adhesion compositions in accordance with claim 1 wherein the polyester resin has a glass transition temperature in the range of about 50° to about 85° C.

6. The low surface adhesion compositions in accordance with claim 1 wherein the epoxy novolac resin is an epoxy cresol novolac resin.

7. A toner composition that comprises the low surface adhesion compositions in accordance with claim 1, a charge control agent, a pigment and a suitable binder wherein the silicone resin is present in an amount in the range of about 0.25 to about 2.0 parts per hundred of toner composition.

8. The toner compositions in accordance with claim 7 wherein the silicone resin is present in an amount in the range of about 0.5 to about 1.0 parts per hundred of toner composition.

9. A method of producing cross-linked low surface adhesion compositions the step of reacting a linear silicone resin, a linear or branched polyester resin and a polyfunctional epoxy novolac resin in a melt reactor to incorporate the silicone resin as an integral part of the composition.

* * * * *

UNITED STATES PATENT AND TRADEMARK OFFICE
CERTIFICATE OF CORRECTION

PATENT NO.    :   5,089,547
DATED         :   February 18, 1992
INVENTOR(S)   :   McCabe et al.

It is certified that error appears in the above-identified patent and that said Letters Patent is hereby corrected as shown below:

Column 3, line 26    "1,4cyclohexanedime" should be --1,4-cyclohexanedime- --.

Column 4, line 53    "wt." should be --wt %--.

Column 5, line 25    "5" should be --1.5--.

Column 5, line 39    "Epolenes TM" should be --Epolenes$^{TM}$--.

Column 8, line 37    "and With" should be --and with--.

Column 9, line 13    "rate Was" should be --rate was--.

Column 10, line 34   "compositions the step" should be --compositions comprising the step--.

Signed and Sealed this

Eighth Day of June, 1993

Attest:

MICHAEL K. KIRK

Attesting Officer    Acting Commissioner of Patents and Trademarks